(12) United States Patent
Schikevitz et al.

(10) Patent No.: US 8,429,801 B2
(45) Date of Patent: Apr. 30, 2013

(54) MOBILE EXTENDABLE BOOM REFURBISHMENT TRAILER

(75) Inventors: Christopher M. Schikevitz, Mansfield, TX (US); Satyen A. Pathak, Dallas, TX (US); Graham N. Brizendine, Fort Worth, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 44 days.

(21) Appl. No.: 13/160,965

(22) Filed: Jun. 15, 2011

(65) Prior Publication Data
US 2011/0302756 A1 Dec. 15, 2011

Related U.S. Application Data

(60) Provisional application No. 61/354,860, filed on Jun. 15, 2010.

(51) Int. Cl.
*B23P 6/00* (2006.01)
*B60P 3/14* (2006.01)

(52) U.S. Cl.
USPC .......... 29/402.01; 29/402.03; 29/402.04; 29/897.2; 296/24.32

(58) Field of Classification Search .......... 296/24.32; 180/89.1, 89.11, 89.12; 280/6.15, 6.151, 280/6.159; 29/897.2, 402.01, 402.03, 402.04, 29/426.1, 426.3
See application file for complete search history.

(56) References Cited

U.S. PATENT DOCUMENTS 5,833,294 A * 11/1998 Williams et al. .......... 296/24.32

* cited by examiner

*Primary Examiner* — Jermie Cozart

(57) ABSTRACT

A trailer and method for servicing an extendable boom loading apparatus. The trailer includes an end, a support structure, and a plurality of tools. The end opens and receives the extendable boom loading apparatus when extended. The support structure is coupled to the trailer and supports at least a part of the extendable boom loading apparatus at a convenient working height for a technician in the trailer. The tools are coupled to the trailer and are operable to service the extendable boom loading apparatus.

18 Claims, 5 Drawing Sheets

MOBILE EXTENDABLE BOOM REFURBISHMENT TRAILER

CROSS-REFERENCE TO RELATED APPLICATIONS

The present application is related to, and claims priority to, U.S. Provisional Patent Application No. 61/354,860, filed Jun. 15, 2010, which is hereby incorporated by reference into the present application as if fully set forth herein.

TECHNICAL FIELD

The present disclosure is directed, in general, to mail and parcel handling equipment.

BACKGROUND OF THE DISCLOSURE

Improved and more efficient systems for servicing and refurbishing extendable booms for trailer and container loading and unloading are desirable.

SUMMARY OF THE DISCLOSURE

Various disclosed embodiments include a trailer and method for servicing an extendable boom loading apparatus. In one embodiment, a trailer includes an end, a support structure, and a plurality of tools. The end is configured to open and to receive the extendable boom loading apparatus when extended. The support structure is coupled to the trailer and configured to support at least a part of the extendable boom loading apparatus. The tools are coupled to the trailer and are operable to service the extendable boom loading apparatus.

In another embodiment, a method of servicing an extendable boom loading apparatus mounted adjacent to a loading dock includes positioning an open end of a trailer adjacent to the loading dock. The open end of the trailer is configured to receive the extendable boom loading apparatus. The method also includes supporting at least a part of the extendable boom loading apparatus using a support structure coupled to the trailer. The part of the extendable boom loading apparatus is supported at a convenient working height for a technician in the trailer. The method further includes servicing the extendable boom loading apparatus using a plurality of tools coupled to the trailer.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the term "couple" and its derivatives refer to any direct or indirect connection between two or more elements, whether or not those elements are in physical contact with one another; the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
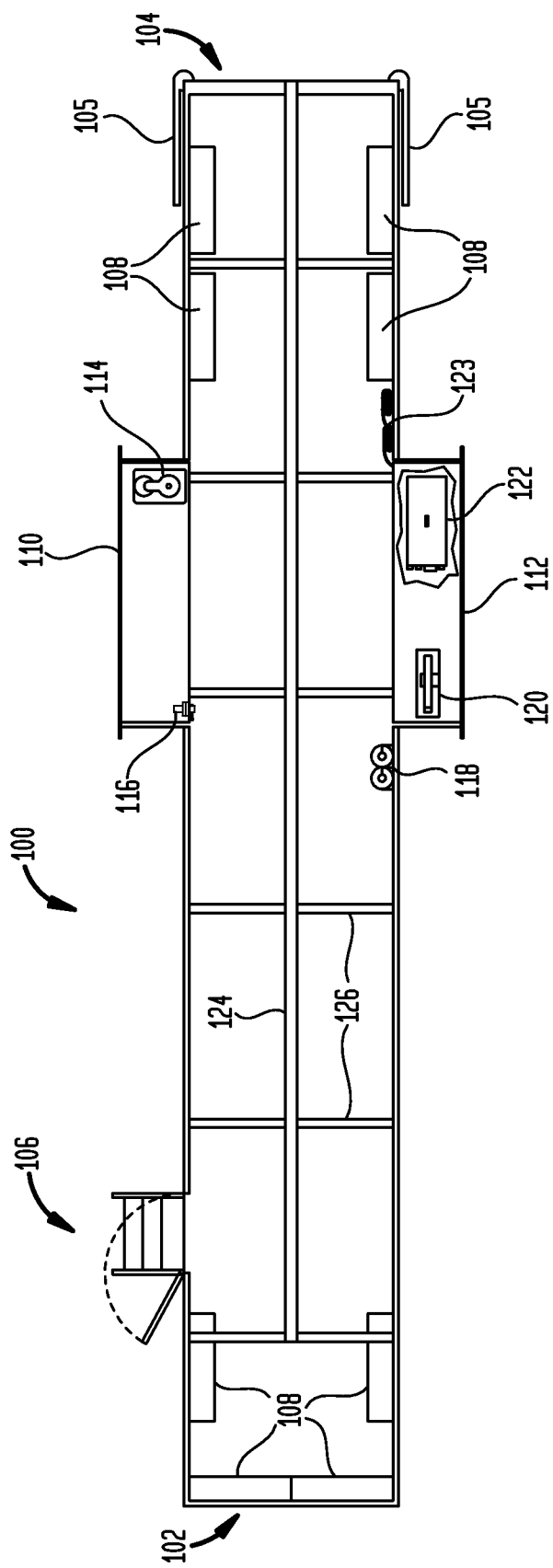
FIG. 1 depicts a top cutaway view schematic diagram of a trailer according to disclosed embodiments.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Extendable boom loaders are often installed at loading docks for trucks, trailers, containers and the like. A base of the loader is typically mounted to the floor of a loading dock, just inside a bay door. A warehouse or other transfer facility typically has several loading docks with extendable loaders. Outside the transfer facility is a trailer/container "yard" where containers may be maneuvered into position adjacent to a selected loading dock, for loading or unloading. The loaders may be extended to reach into the positioned container, in order to minimize lifting and carrying of packages by loading personnel, and retracted to a stored position entirely within the transfer facility, to minimize space taken up by the loader when not in use.

An extendable boom loader includes a plurality of boom elements that telescope from the base of the loader into the container. The boom elements are nested one within another, and within the base, proceeding from a largest boom element closest to the base (the "proximal boom element") to a smallest, innermost, boom element, which extends farthest into the container (the "distal boom element").

Some extendable loaders (referred to as "gravity loaders") are extendable into a container at an angle from the horizontal. In such loaders, gravitational forces cause packages to move into or out of the container along the loader on a plurality of free-rolling balls or cylinders. Other extendable loaders include a powered conveyor belt or other transport mechanism to move packages into or out of a container.

Typically, repair or refurbishment of an extendable boom loader is performed by extending the boom from the loading dock through the open bay door when a container is not present at the associated loading dock. Thus, the loader is extended into open space in an area of the container yard adjacent to the loading dock. The floor of the loading dock is typically about four feet above the container yard ground level, and the top of the extendable boom loader is typically waist height (about three feet) above the floor of the loading dock. Thus, when extended into the container yard, an extendable boom loader is typically about seven feet above ground level.

Technicians typically use ladders to reach the boom. Where removal of a boom element is required, a forklift or other powered lifting device is positioned under the boom element. Once the boom element is uncoupled from other boom elements, the forklift is used to lower the boom element to the ground or to carry the boom element to another loading dock, where work may be performed inside the transfer facility.

Boom loader repair or refurbishment may require welding, grinding, drilling, and/or spraying of paint or other coatings. Some tools may produce noises loud enough to require ear protectors. Welding tools may produce ultraviolet rays. Spraying operations may produce fumes. Such activities may be dangerous or annoying to personnel working at nearby loading docks. Where such activities are performed on a loading dock within a transfer facility, technicians may be required to set up screens or other shields to isolate the work area from nearby personnel. Spraying paint and/or coatings is typically performed in the container yard.

Various disclosed embodiments include a mobile trailer that may be used on-site at loading docks where extendable boom loaders are installed. The trailer is a standalone, fully operational work area in which required mechanical or machine shop tasks may be performed for servicing, repairing, or refurbishing an extendable boom loader (the terms are used interchangeably herein to refer to all such activities). An extendable boom loader can be fully refurbished inside the trailer, typically by two technicians. Wing extensions that slide out from the trailer increase working space and space for tools and parts. Sufficient parts may be stored in the trailer to refurbish several extendable units at a single transfer facility. The trailer is structurally reinforced to support, in some embodiments, as much as 5 tons using a trolley system that includes a support structure and hoists. The trolley system can suspend the entire extendable boom loader from above.

A trailer according to the disclosure is outfitted with parts, tools and supplies for refurbishing one or more brands or models of extendable boom loader. Use of the trailer increases efficiency and reduces downtime for the extendable boom loader being refurbished. Use of the trailer also reduces the amount of space required to perform a refurbishment process, reducing the impact of refurbishment on other portions of the transfer facility. Current methods can block off as many as four loading docks while servicing a single extendable boom loader. The trailer encloses refurbishment activities, providing improved safety for, and reduced interference with, nearby transfer facility personnel.

Where the refurbishment process currently requires as many as three days to complete and requires four technicians, use of the trailer according to the disclosure may reduce that time to one day and the personnel requirement to two technicians.

FIG. 1 depicts a top cutaway view schematic diagram of a trailer 100 according to disclosed embodiments. The top of the trailer 100 is not depicted in FIG. 1, in order to show elements inside the trailer 100. The trailer 100 includes a front end 102 and a back end 104. The back end 104 includes doors 105 that provide access to the interior of the trailer 100 when open. A personnel door and stairs 106 provide access to the trailer 100 from the container yard when the trailer 100 is positioned against a loading dock. Personnel may also access the trailer 100 through the open back end 104.

Storage facilities 108 (such as shelves and drawers) are provided within the trailer 100 to hold parts and supplies for extendable boom servicing. Extensions 110 and 112 are positioned on opposite sides of the trailer 100 and provide mounting locations for tools. In other embodiments, more or fewer extensions may be provided and may be positioned on either side of the trailer and in any desired position relative to each other. The extensions 110 and 112 may be placed in a stowed configuration, retracted into the trailer 100, during transport and placed in a deployed configuration, extended from a side of the trailer 100, when the trailer 100 is positioned adjacent to a loading dock. In the extended configuration, the extensions 110 and 112 provide additional floor space and working area within the trailer 100. In other embodiments, no extensions are provided.

The trailer 100 can include a plurality of tools suitable for servicing an extendable boom loader. The extension 110 includes a drill press 114 and a vise 116. The extension 112 includes a hydraulic press 120 and a first welding apparatus 122 (in this embodiment, a metal inert gas (MIG) welding apparatus). Welding cables 123 may be stowed on a nearby wall of the trailer 100, in order to remain attached to the welding apparatus 122, and may be extended to reach any part of an extendable boom during servicing. A second welding apparatus 118 (in this embodiment a gas welding apparatus) is mounted to a wall of the trailer 100. A weld curtain or other isolation apparatus may be placed across the open back end 104 of the trailer 100 to block ultraviolet radiation generated during welding, reduce leakage of fumes and noise from the trailer 100 into the transfer facility, and otherwise reduce or prevent byproducts of activities in the trailer 100 from leaving the trailer 100 and transferring into the interior of the transfer facility.

Within the trailer is a beam 124, suspended from cross members 126 and extending along a length of the trailer 100. As will be described in greater detail with reference to FIG. 2, one or more hoists (not shown in FIG. 1) are movably coupled to the beam 124. Boom elements of an extendable boom undergoing repair or refurbishment may be suspended from the beam 124 by the one or more hoists and, once uncoupled from other boom elements, moved to another position in the trailer 100.

While particular tools are shown in the embodiment of FIG. 1, in other embodiments any suitable tools used in repair or refurbishment of extendable boom loaders may be included in a trailer according to the disclosure. While tools are shown in FIG. 1 mounted to the extensions 110 and 112 (that is, coupled indirectly to the trailer 100), in embodiments without extensions the tools may be coupled directly to the trailer 100. While shelves and drawers 108 are shown in FIG.

1, other embodiments may provide other types of storage facilities for parts and supplies. While a flat trailer 100 is shown, in other embodiments a drop frame trailer may be used to provide additional work space under the extendable boom being refurbished.

Figure 2:
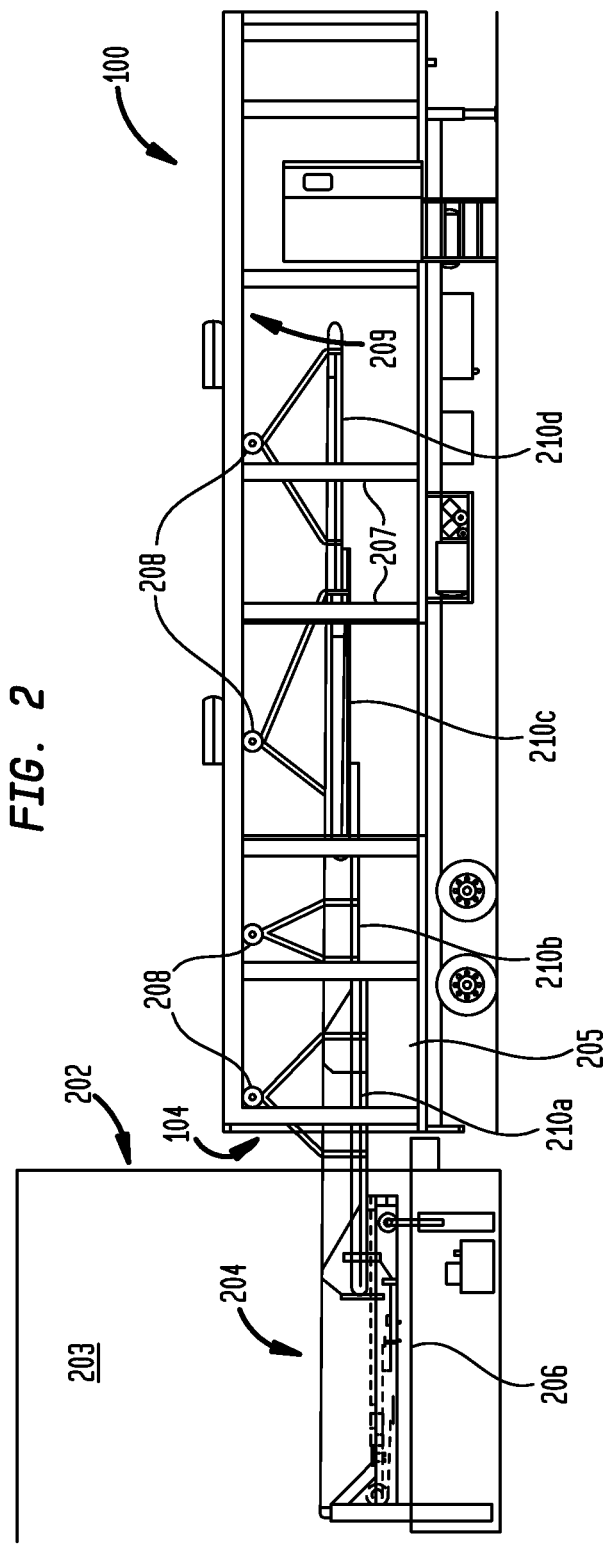
FIG. 2 depicts a right side cutaway view schematic diagram of a trailer according to disclosed embodiments.

FIG. 2 depicts a right side cutaway view schematic diagram of the trailer 100 according to disclosed embodiments. A side wall of the trailer 100 is not depicted in FIG. 2, in order to show elements inside the trailer 100. The back end 104 of the trailer 100 is positioned adjacent to a loading dock 202 of a transfer facility 203. An extendable boom loader 204 is mounted to the floor of the transfer facility 203, adjacent to the loading dock 202.

Boom elements 210a, 210b, 210c and 210d (numbered in proximal to distal order and collectively referred to as boom elements 210) of the loader 204 are extended into the trailer 100. Because a floor 205 of the trailer 100 is at approximately the same height from the ground as a floor 206 of the loading dock 202, the boom elements 210 and other elements of the loader 204 are at approximately waist height for technicians in the trailer 100 (for example, two to four feet from the floor 205). In other embodiments, the floor of a trailer according to the disclosure may be at another convenient working height for technicians in the trailer. In embodiments where servicing is performed on an underside of the boom elements 210, the floor 205 of the trailer may be configured to be at a convenient height of five or six feet below the boom elements 210.

Hoists 208 are movably coupled to the beam 124 and configured to be moved along the length of the beam 124. The boom elements 210 are each suspended by straps from a corresponding hoist 208. The beam 124 is supported on upright supports 207. The supports 207 and the cross members 126 (shown in FIG. 1) create a support structure 209 for the beam 124 within the trailer 100. The boom elements are suspended from the support structure 209 at a convenient working height for technicians in the trailer. The structure 209 is coupled to the trailer 100 and transfers the weight of boom elements 210 and/or other items to the floor of the trailer 100. The structure 209 is not directly coupled to the walls or roof of the trailer 100, which are typically not sturdy enough to support heavy weights. Where other parts (such as the walls and/or roof) of a trailer according to the disclosure are sturdy enough to support heavy weights, the support structure 209 may be coupled to such other parts of the trailer.

Suspending the boom elements 210 from the hoists 208 provides additional support to the boom elements 210 during servicing. If the boom elements are to be detached from each other during servicing, they may remain suspended from the hoists 208 and moved along the length of the trailer 100 to any desired location. Boom elements 210 may also be lowered to rest on sawhorses or other supports (not shown in FIG. 2) for servicing.

Figure 3:
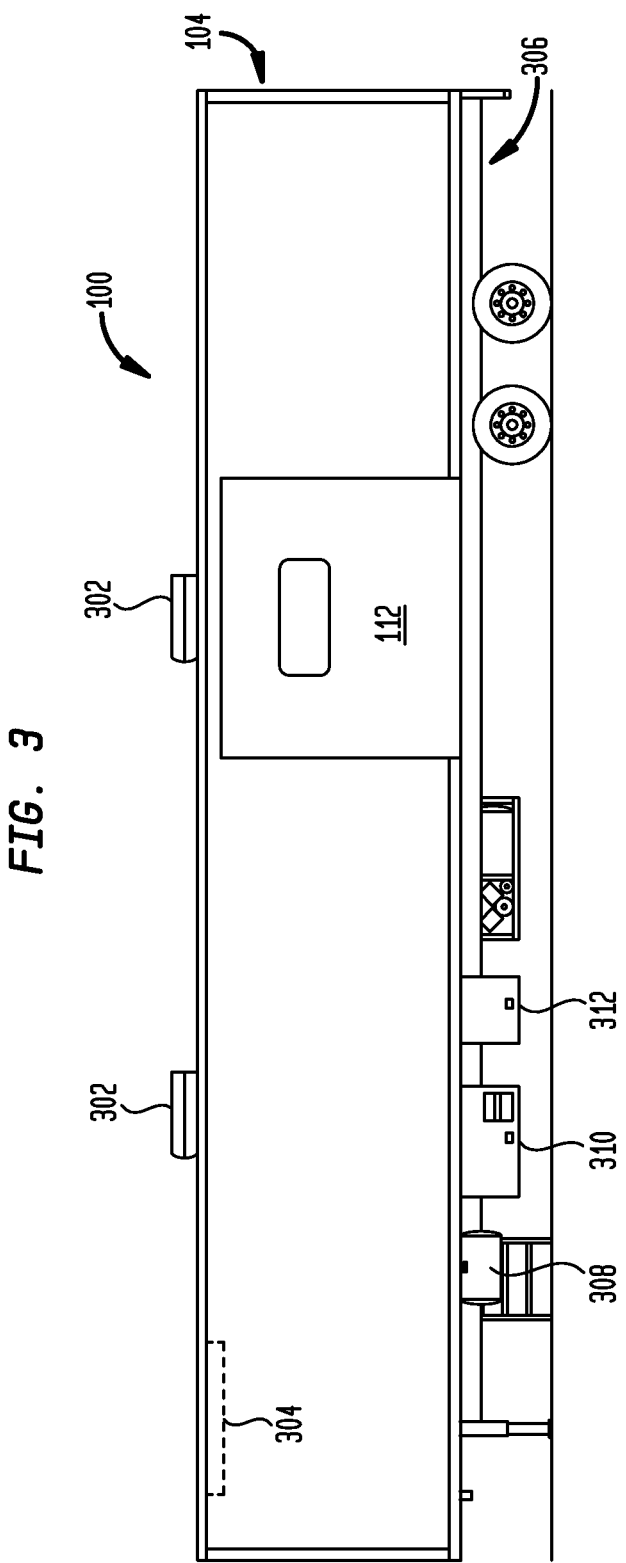
FIG. 3 depicts a left side view schematic diagram of a trailer according to disclosed embodiments.

FIG. 3 depicts a left side view schematic diagram of the trailer 100 according to disclosed embodiments. The trailer 100 includes two air conditioning units 302 to cool the interior of the trailer 100. When spraying paint or other coatings, an exhaust fan 304 draws air from outside the trailer 100 through a vent 306 in the floor of the trailer 100, along the length of the trailer 100, and out through the exhaust fan 304, expelling fumes produced by the spraying operation. Because the exhaust fan 304 is at the front end 102 of the trailer 100, any such fumes are blown out of the trailer at a distance from the loading dock 202. While a single exhaust fan and vent are shown in FIG. 3, in other embodiments any number of exhaust fans and/or vents may be provided.

A fuel tank 308 provides fuel for a generator 310 and other devices in the trailer 100. A "shore power" cable 312 is provided to couple electrical systems of the trailer 100 to one or more electrical power sources in the transfer facility ("shore power"). The extension 112 (the "driver side" extension) is also visible in FIG. 3.

Figure 4:
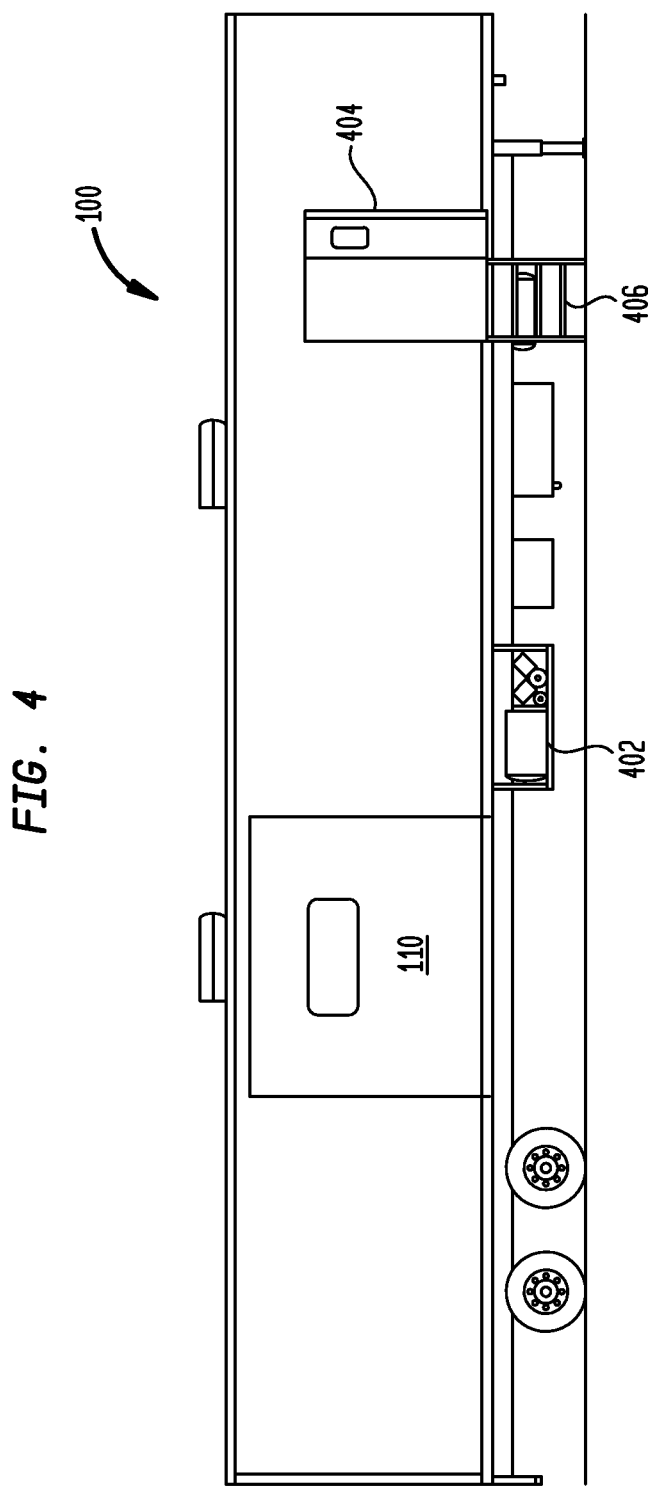
FIG. 4 depicts a right side view schematic diagram of a trailer according to disclosed embodiments.

FIG. 4 depicts a right side view schematic diagram of the trailer 100 according to disclosed embodiments. An air compressor 402 provides compressed air for pneumatic tools. A personnel door 404 is reachable using steps 406. The steps may be stowed within the trailer 100 during transport and deployed once the trailer 100 is positioned at a loading dock. The extension 110 (the "passenger side" extension) is also visible in FIG. 4.

Figure 5:
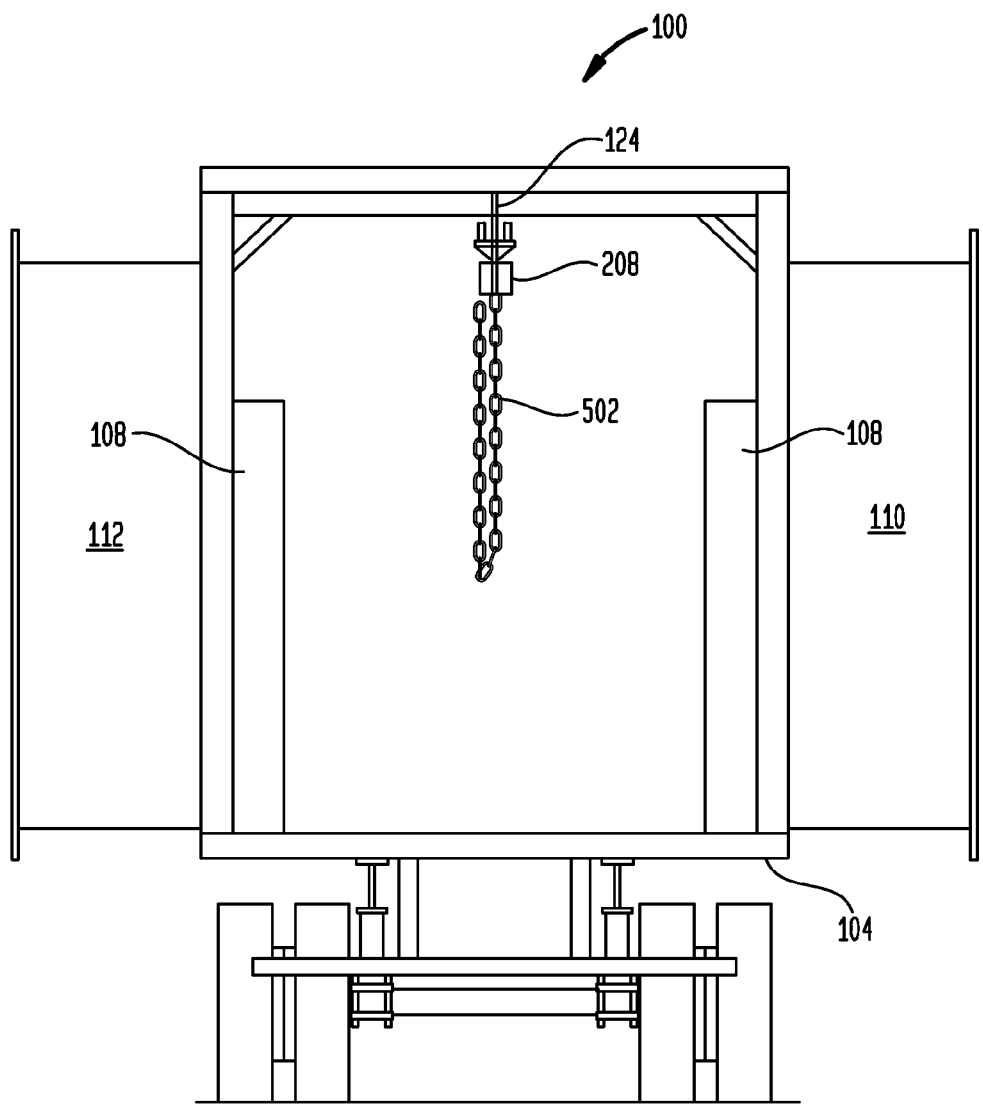
FIG. 5 depicts a rear view schematic diagram of a trailer according to disclosed embodiments.

FIG. 5 depicts a rear view schematic diagram of the trailer 100 according to disclosed embodiments. Rear doors of the trailer 100 are not shown in FIG. 5. The back end 104 of the trailer 100 is open to allow an extendable boom loader to be extended into the trailer 100. The extensions 110 and 112 have been extended and storage facilities 108 are visible. A hoist 208 is suspended from the beam 124, and is operated by a chain 502.

An operational example is now presented with reference to the elements of FIGS. 1-5. Doors 105 are opened at the back end 104 of the trailer 100 and the trailer 100 is backed up to the loading dock 202. The generator 310 is powered up to reduce or eliminate reliance on shore power, and the extensions 110 and 112 are extended. The extendable boom loader 204 is extended fully into the trailer 100, and any conveyor belt is removed. Hoists 208 are attached to the boom elements 210a-210d to provide support. Distal boom element 210d is uncoupled from the loader 204 and moved onto saw horses located at the front end 102 of the trailer 100. Boom elements 210c and 210b are uncoupled and may be placed on the floor in the middle portion of the trailer 100. The boom element 210a is uncoupled from the base of the loader 204 and may be placed on the floor of the trailer 100 or remain suspended by one or more hoists 208. Refurbishment may be performed on the base of the loader 204, which remains in the transfer facility.

Safety barriers (such as a weld curtain) may be deployed at the back end 104 of the trailer 100 and refurbishment of the boom elements 210 begun. Once all mechanical, electrical and other refurbishment activities have been completed, the boom loader 204 is reassembled and activated, to check for proper operation. The trailer 100 may then be removed from the loading dock 202 and the extendable loader 204 returned to operation.

It will be understood that some steps of the exemplary process presented above may be performed simultaneously, concurrently, or in a different order than presented above.

Those skilled in the art will recognize that, for simplicity and clarity, the full structure and operation of all systems suitable for use with the present disclosure is not being depicted or described herein. Instead, only so much of the physical systems as is unique to the present disclosure or necessary for an understanding of the present disclosure is depicted and described. The remainder of the construction and operation of the systems disclosed herein may conform to any of the various current implementations and practices known in the art.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A trailer configured to service an extendable boom loading apparatus, the trailer comprising:
   an end, configured to open and to receive the extendable boom loading apparatus when extended;
   a support structure coupled to the trailer, including a beam extending along a length of the trailer and a hoist movably coupled to the beam, the support structure configured to support at least a part of the extendable boom loading apparatus with the hoist; and
   a plurality of tools coupled to the trailer, the plurality of tools operable to service the extendable boom loading apparatus.

2. The trailer of claim 1, wherein the trailer further comprises an extension configured to be retracted for transport and extended from a side of the trailer to provide additional working area within the trailer.

3. The trailer of claim 2, wherein one or more of the plurality of tools are mounted to the extension.

4. The trailer of claim 1, further comprising storage facilities for one or more of parts and supplies for servicing the extendable boom loading apparatus.

5. The trailer of claim 1, wherein the hoist includes a chain configured to operate the hoist.

6. The trailer of claim 1, further comprising an isolation apparatus, configured to be placed across the end of the trailer and reduce or prevent byproducts of activities in the trailer from leaving the trailer.

7. The trailer of claim 1, further comprising an exhaust fan configured to expel fumes from the trailer.

8. The trailer of claim 1, wherein the support structure is coupled to a floor of the trailer.

9. A method of servicing an extendable boom loading apparatus mounted adjacent to a loading dock, the method comprising:
   positioning an open end of a trailer adjacent to the loading dock, wherein the open end of the trailer is configured to receive the extendable boom loading apparatus;
   supporting at least a part of the extendable boom loading apparatus using a support structure coupled to the trailer, the part of the extendable boom loading apparatus supported at a convenient working height for a technician in the trailer; and
   servicing the extendable boom loading apparatus using a plurality of tools coupled to the trailer.

10. The method of claim 9, wherein the trailer includes an extension, the method further comprising:
    extending the extension from a side of the trailer to provide additional working area within the trailer.

11. The method of claim 10, wherein one or more of the plurality of tools are mounted to the extension.

12. The method of claim 9, wherein the trailer includes an storage facilities, the method further comprising storing one or more of parts and supplies for servicing the extendable boom loading apparatus in the storage facilities.

13. The method of claim 9, wherein
    the support structure includes a beam extending along a length of the trailer, and
    supporting at least a part of the extendable boom loading apparatus using a support structure includes supporting the part of the extendable boom loading apparatus using the beam.

14. The method of claim 13, wherein
    the support structure includes a hoist movably coupled to the beam and
    supporting at least a part of the extendable boom loading apparatus using a support structure includes supporting the part of the extendable boom loading apparatus using the hoist.

15. The method of claim 14, further comprising using a chain to operate the hoist.

16. The method of claim 9, further comprising placing an isolation apparatus across the end of the trailer, the isolation apparatus configured to reduce or prevent byproducts of activities in the trailer from leaving the trailer.

17. The method of claim 9, further comprising expelling fumes from the trailer using an exhaust fan.

18. The method of claim 9, wherein the support structure is coupled to a floor of the trailer.

\* \* \* \* \*